US010752277B2

(12) United States Patent
Haigh

(10) Patent No.: US 10,752,277 B2
(45) Date of Patent: Aug. 25, 2020

(54) POSITIONABLE WHEELCHAIR HANDLE AND LOCK

(71) Applicant: CENTICARE Corporation, Minnetonka, MN (US)

(72) Inventor: James H. Haigh, Minnetonka, MN (US)

(73) Assignee: CENTICARE Corporation, Minnetonka, MN (US)

( * ) Notice: Subject to any disclaimer, the term of this patent is extended or adjusted under 35 U.S.C. 154(b) by 0 days.

(21) Appl. No.: 16/356,717

(22) Filed: Mar. 18, 2019

(65) Prior Publication Data

US 2019/0282418 A1  Sep. 19, 2019

Related U.S. Application Data

(60) Provisional application No. 62/643,957, filed on Mar. 16, 2018.

(51) Int. Cl.
*B62B 5/06* (2006.01)
*A61G 5/10* (2006.01)

(52) U.S. Cl.
CPC .............. *B62B 5/064* (2013.01); *B62B 5/066* (2013.01); *B62B 5/067* (2013.01); *A61G 5/10* (2013.01); *B62B 5/06* (2013.01); *B62B 2202/42* (2013.01)

(58) Field of Classification Search
CPC ..................................................... B62B 5/06; B62B 5/064; B62B 5/067; B62B 5/066; A61G 5/10
USPC ........................................... 16/426; 74/551.3
See application file for complete search history.

(56) References Cited

U.S. PATENT DOCUMENTS

| 2,901,263 | A | * | 8/1959 | Van Loon, Jr. | ............ | B62B 5/06 |
| | | | | | | 280/47.31 |
| 4,023,436 | A | * | 5/1977 | Dodge | .................... | B62K 21/16 |
| | | | | | | 74/551.3 |
| 4,542,918 | A | | 9/1985 | Singleton | | |
| 4,664,441 | A | * | 5/1987 | Collins | ..................... | A61G 5/10 |
| | | | | | | 297/183.2 |
| 4,863,181 | A | | 9/1989 | Howle | | |
| 5,018,405 | A | * | 5/1991 | Chiu | ......................... | B62B 9/20 |
| | | | | | | 16/349 |
| 5,044,650 | A | | 9/1991 | Eberle, Jr. | | |
| 5,244,225 | A | * | 9/1993 | Frycek | ................. | A61G 5/1054 |
| | | | | | | 280/304.1 |

(Continued)

*Primary Examiner* — Jeffrey O'Brien
(74) *Attorney, Agent, or Firm* — DuFault Law Firm, P.C.; Dustin R. DuFault

(57) ABSTRACT

A positionable handle device for use with a wheelchair comprises a first member attachable to an existing handle of the wheelchair, a second member pivotally connected to the first member and, a locking mechanism to lock the second member in either a first upwardly extending position or a second downwardly extending position. The locking mechanism comprises a first tenon extending from the first member, a second tenon extending from the second member, and a slidable mortise into which the first and second tenons dispose. The mortise contains a first aperture extending therethrough and a second aperture at least partially extending inward from a lower portion of one side containing the second tenon. The mortise is positionable between a lowered and raised position. When in the lowered position, the mortise locks the tenons in place. When in the raised position, the mortise permits the second tenon to pivot.

9 Claims, 4 Drawing Sheets

(56) References Cited

U.S. PATENT DOCUMENTS

| | | | | |
|---|---|---|---|---|
| 5,290,055 A * | 3/1994 | Treat, Jr. | ............... | A61G 5/10 16/426 |
| 5,568,933 A * | 10/1996 | Mizuno | ............... | A61G 5/08 280/250.1 |
| 5,647,095 A * | 7/1997 | Takimoto | ............. | E05B 1/0015 16/405 |
| 5,765,958 A * | 6/1998 | Lan | ............... | B62B 7/06 403/84 |
| 5,810,375 A * | 9/1998 | Hoffarth | ............... | B62B 5/06 16/446 |
| D407,672 S * | 4/1999 | Wells | ............... | D12/133 |
| 5,915,712 A * | 6/1999 | Stephenson | ............. | A61G 5/10 16/422 |
| 6,182,529 B1 | 2/2001 | White | | |
| 6,317,924 B1 * | 11/2001 | Gallagher | ............... | A45C 13/26 16/113.1 |
| 6,336,254 B1 * | 1/2002 | Graff | ............... | B62B 5/06 16/422 |
| 6,550,104 B2 * | 4/2003 | Cacciacarne | ............ | B62B 5/06 16/426 |
| 6,722,689 B2 * | 4/2004 | Kreamer | ............. | A63B 21/023 280/47.38 |
| 7,290,776 B2 * | 11/2007 | Pascznk | ............... | B62B 5/06 280/47.371 |
| 7,500,689 B2 | 3/2009 | Pasternak et al. | | |
| 7,657,973 B1 * | 2/2010 | Hermann | ............... | B62B 5/06 16/110.1 |
| 7,658,390 B2 * | 2/2010 | Martin | ............... | B62B 5/06 16/422 |
| 7,694,606 B1 * | 4/2010 | Williams | ............... | A61G 5/10 74/551.3 |
| 7,866,686 B2 * | 1/2011 | Conaway | ............... | B62B 1/208 280/47.31 |
| 7,886,854 B2 | 2/2011 | Chiu | | |
| 8,215,652 B2 | 7/2012 | Dashew et al. | | |
| 8,641,078 B2 | 2/2014 | Yang | | |
| 9,296,404 B1 * | 3/2016 | Bell | ............... | B62B 1/12 |
| D769,777 S * | 10/2016 | Haigh | ............... | D12/133 |
| 9,931,255 B2 * | 4/2018 | Haigh | ............... | A61G 5/08 |
| 10,463,548 B1 * | 11/2019 | Haigh | ............... | B62B 5/06 |
| 2003/0229966 A1 * | 12/2003 | Boice | ............... | B62B 9/20 16/110.1 |
| 2005/0211011 A1 * | 9/2005 | Victor | ............... | A61G 5/10 74/551.1 |
| 2005/0258007 A1 * | 11/2005 | Albert | ............... | B62B 1/18 188/2 D |
| 2009/0001689 A1 * | 1/2009 | Swenson | ............... | A61G 5/10 280/304.1 |
| 2010/0194066 A1 * | 8/2010 | Martin | ............... | B62B 5/06 280/47.315 |
| 2013/0104691 A1 * | 5/2013 | Chesner | ............... | B62K 21/26 74/551.9 |
| 2014/0300079 A1 | 10/2014 | Rhodes | | |
| 2016/0228312 A1 * | 8/2016 | Quinn | ............... | A61G 5/10 |
| 2016/0256338 A1 * | 9/2016 | Quinn | ............... | A61G 5/10 |
| 2019/0038485 A1 * | 2/2019 | Minardo | ............... | A61G 5/10 |

\* cited by examiner

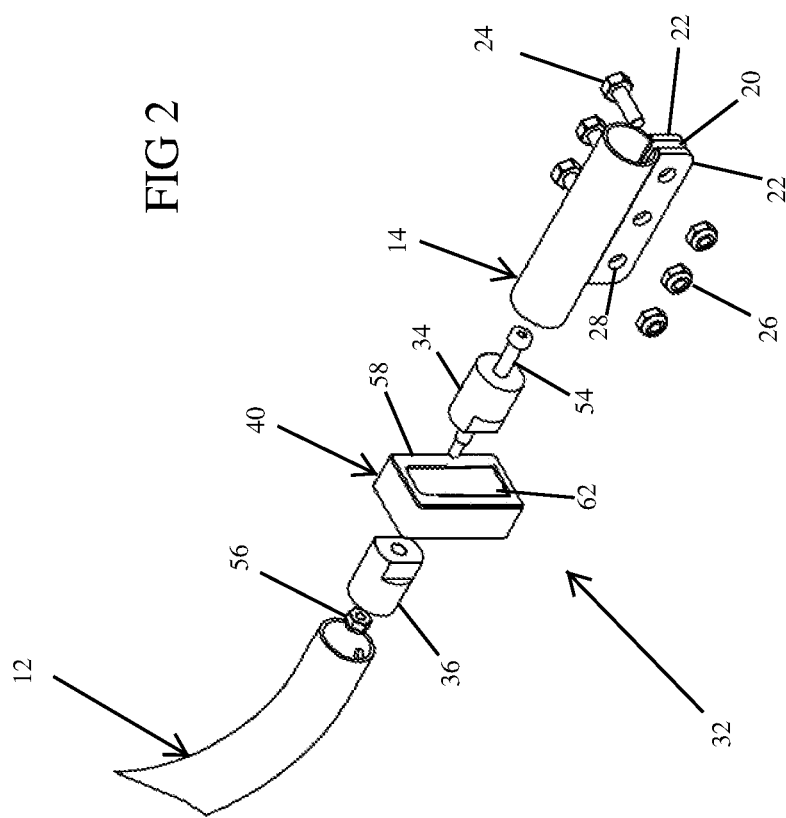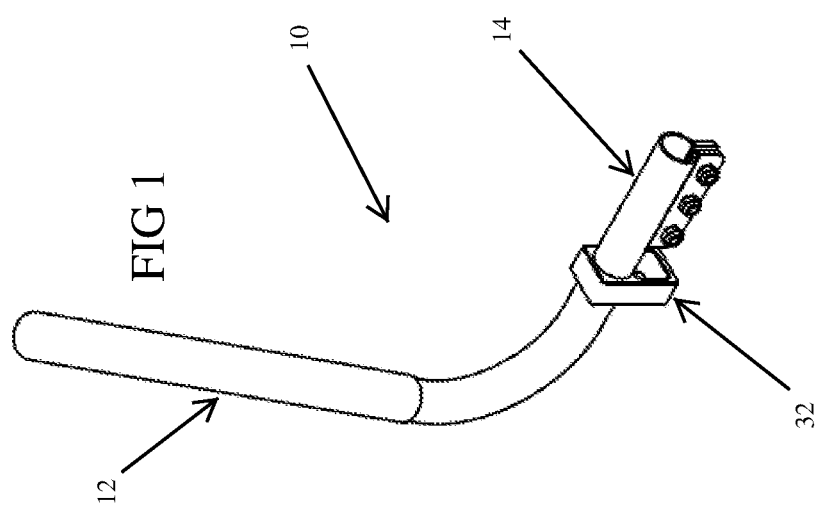

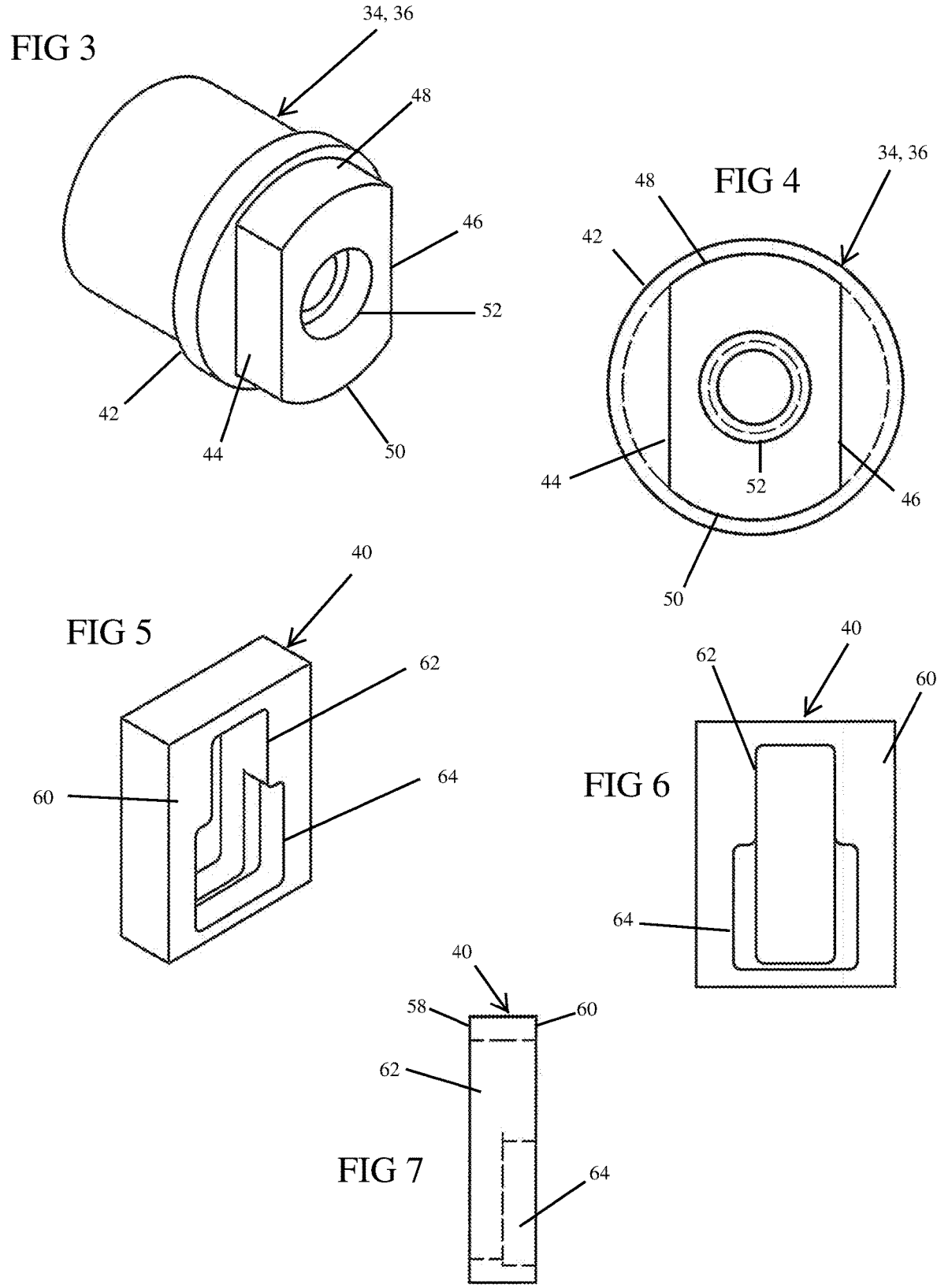

POSITIONABLE WHEELCHAIR HANDLE AND LOCK

CROSS-REFERENCE TO RELATED APPLICATION

The present application claims a benefit of U.S. Provisional Application No. 62/643,957 filed Mar. 16, 2018.

BACKGROUND OF THE INVENTION

The present invention is generally directed at wheelchairs. More specifically, the present invention includes an ergonomic extension handle attachable to an existing wheelchair handle such that the extension handle is positionable between a first generally upright position, as opposed to a generally horizontal position, and a second generally downward position.

Wheelchairs are well known in the art as a means of assisting or transporting those who can not, or have a difficult time, walking on their own. Wheelchairs of the prior art generally have two rearwardly positioned handles by which an assistant can grab hold of and maneuver the wheelchair. The handles are generally extend horizontally relative the ground. Because of the positioning of the handles, most users must bend over or hunch downward when grasping the handles in maneuvering the wheelchair. For assistants having greater than average stature, this can lead to discomfort and back pain as this is an unnatural position. Commonly owned U.S. Pat. No. 9,931,255, the entirety of which is incorporated herewith by this reference, discloses a handle attachable to a foldable wheelchair which includes a vertically oriented portion. However, in instances where the wheelchair needs to be transported in a car or other vehicle, the vertically oriented handles can at times be a hindrance to placing the wheelchair into the vehicle.

There therefore exists a need in the art to provide a wheelchair with a positionable handle such that the wheelchair can be easily placed or stowed in a vehicle during transport.

BRIEF SUMMARY OF INVENTION

The present invention includes a two-position handle device for use with a wheelchair. The device generally comprises a first member attachable to an existing handle of the wheelchair, a second member rotatably connected to the first member, and a locking mechanism to lock the second member in either a first upwardly extending position or a second downwardly extending position. The locking mechanism comprises a first tenon extending from the first member, a second tenon extending from the second member, and a slidable mortise into which both the first tenon and the second tenon are disposed. The first tenon and the second tenon have similar dimension, with each configured to have semi-circular top and bottom ends with parallel sidewalls. The first tenon and the second tenon rotatably connect to one another by means of an internal fastener, such as a bolt and threaded nut. The slidable mortise includes a first major surface and an opposing second major surface wherein a first aperture of rectangular configuration extends from the first major surface through to the second major surface. The first aperture is configured to receive the first tenon from the first major surface and the second tenon from the second major surface. The first aperture has a width to accommodate the first tenon and the second tenon. The first aperture has a height of at least double that of the first tenon and the second tenon. The mortise contains a second aperture extending partially inward from a lower portion of the second major surface to a depth of approximately that of the depth of the second tenon. The second aperture has a larger width than the first aperture, to accommodate the height of the second tenon.

The mortise is positionable between a first lowered locked position and a second upward unlocked position. In the first lowered locked position, the first aperture engages both the first and the second tenons, thereby locking the first and the second tenons in place. In the second upward unlocked position, the first aperture engages only the first tenon, thereby permitting the second tenon to rotate about the area of the second aperture.

BRIEF DESCRIPTION OF THE DRAWINGS

The following figures are used herein in conjunction with the written description to assist in understanding the invention. The Figures are as follows:

FIG. 1 is a perspective view of positionable wheelchair handle and lock in accordance with the present invention.

FIG. 2 is a partial exploded view of the positionable wheelchair handle and lock of FIG. 1.

FIG. 3 is a perspective view of a tenon in accordance with the present invention.

FIG. 4 is a frontal view of the tenon in accordance with the present invention.

FIG. 5 is a perspective view of a mortise in accordance with the present invention.

FIG. 6 is a back view of the mortise in accordance with the present invention.

FIG. 7 is a side view of mortise in accordance with the present invention.

DESCRIPTION OF THE INVENTION

Figure 10:
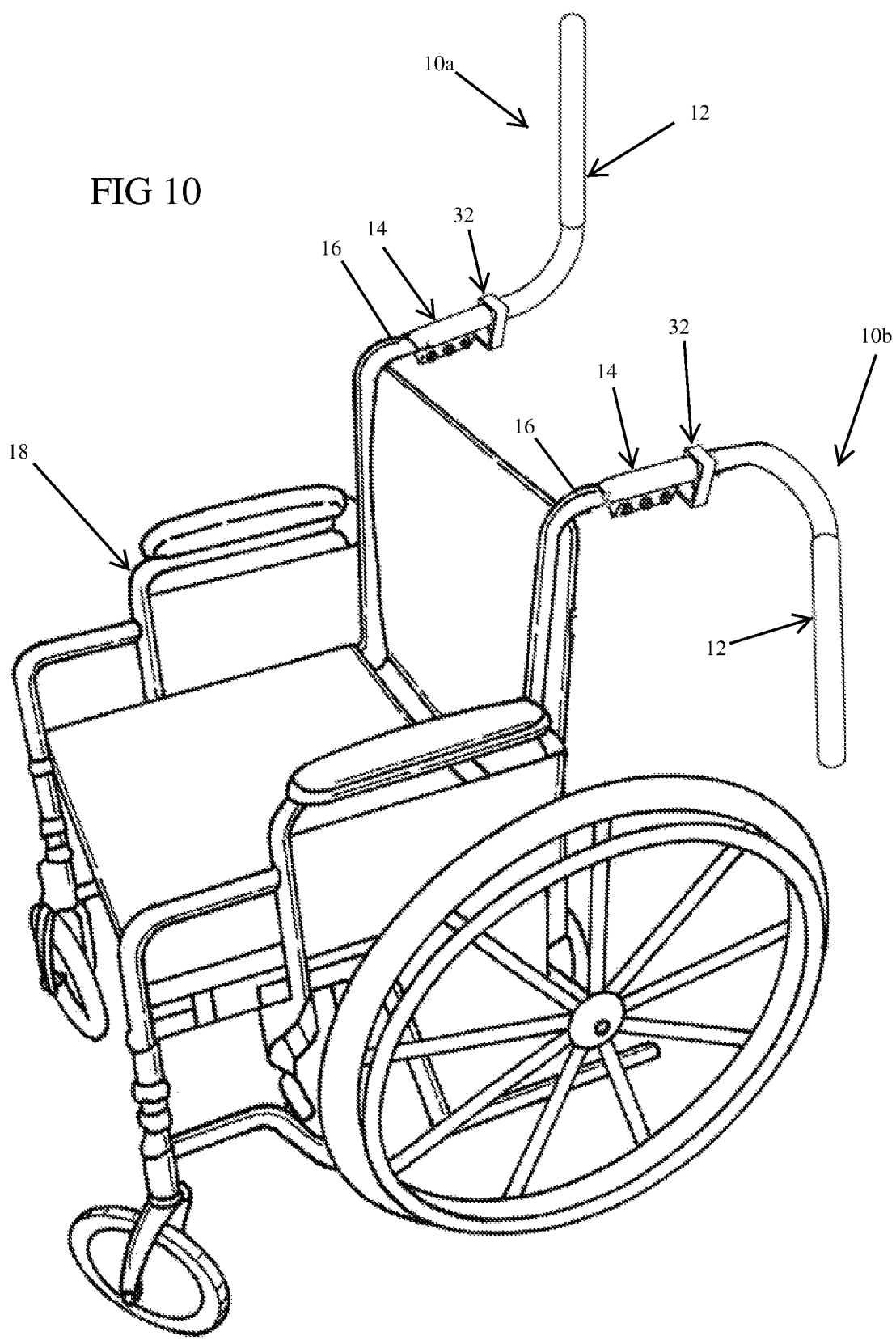
FIG. 10 is a perspective view of wheelchair handles and locks of the present invention attached to a wheelchair, with one handle in the raise position and the other in a lowered position.

Referring to FIG. 1, a wheelchair handle of the present invention is generally indicated at 10. The handle 10 is configured from a hollow tube or pipe, preferably metallic, but can be made from any suitable material. The handle 10 has a generally "J"-shaped configuration, including a grasping portion or member 12 and a connecting portion or member 14. The grasping portion 12 and the connecting portion 14 are preferably off-set from on another by an angle of 80 degrees to accommodate attachment to existing wheelchair handles, which may have a downward cant. However, it is well within the scope of the present invention that this off-set angle be between 70 and 110 degrees to accommodate existing wheelchair handles from a variety of manufacturers. The tubular connection section is sized such that it will fit over an existing wheelchair handle 16 to attach the handle to a wheelchair 18 (as illustrated in FIG. 10).

To facilitate the connection of the handle 10 to the existing wheelchair handle 16, the connecting portion 14 contains a slot 20 positioned along a relative downward side. The slot 20 enables the tubular connecting portion 14 to flex in order to accommodate different sized existing wheelchair handles 16, as well as provide a compression fit about the same. Attaching plates 22 affix to the connecting portion 14 along each opposing edge of the slot 20. Each attaching plate 22 is urged toward one another by a set of bolts 24 and nuts 26 disposable through cooperating apertures 28 in the plates 22, as best illustrated din FIG. 2. Upon tightening the bolts 24 and nuts 26, the connecting portion 14 is firmly attached to the existing wheelchair handle 16.

The grasping portion 12 and the connecting portion 14 are rotationally connected to one another by means of a locking mechanism 32. The locking mechanism 32 allows a user to lock the grasping portion 14 into a specific orientation relative to the connecting portion 14, the connecting portion 14 being fixedly attached to the existing handle 16 of the wheelchair 18. As best illustrated in FIG. 2, the locking mechanism 32 generally includes a first tenon 34 attached to and extending from the connecting portion 14, and a second tenon 36 attached to and extending from the grasping portion 12. The locking mechanism 32 further includes the first tenon 34 and the second tenon 36 being positioned opposite one another, with a slidable mortise 40 disposed therebetween. Proximal ends of each tenon 34, 36 dispose within, and attach to, respective tubular portions of the grasping portion 12 and connecting portion 14 wherein an outer cylindrical ring 42 may abut against the respective tubular portions 34, 36. As illustrated in FIGS. 3 and 4, each tenon 34, 36 is configured to have opposing parallel straight walls, 44 and 46, respectively, as well as a curved top and bottom ends, 48 and 50, respectively, disposed about the parallel walls 44, 46. A cylindrical bore 52 extends axially through the central portion of each tenon 34, 36, which is configured to receive a threaded bolt 54 and nut 56 to maintain the connection of the grasping portion 12 to the connecting portion 14.

Referring now to FIGS. 5 and 6, the positionable mortise 40, or key, preferably includes a rectangular configuration having a first major surface 58 and an opposing second major surface 60. Positioned centrally about the mortise 40 is a first rectangular slot 62, or aperture, extending from the first major surface 58 through to the second major surface 60. The first aperture 62 preferably has a width approximately the distance between the parallel straight walls 46, 48 of each tenon 34, 36, so as to allow the insertion of each tenon 34, 36 therein. A lower portion of the second face 60 of the mortise 40 includes a second aperture 64 extending approximately halfway into the depth of the mortise 40, and approximately half the height of the first aperture 62. The width of the second aperture 64 corresponds to the greatest distance between the curved top and bottom ends 48, 50 of the second tenon 36, or rather the diameter thereof.

As mentioned, the first tenon 34 attaches to, and extends from, the tubular connecting portion 14, while the second tenon 36 attaches to, and extends from the tubular gripping portion 12. To attach the gripping portion 12 to the connecting portion 14, the distal end of the first tenon 34 is disposed within the first aperture 62 from the first major surface 58, and the distal end of the second tenon 36 is disposed within the first aperture 62 from the second major surface 60, whereupon the bolt 54 is inserted through the bore 52 of the first tenon 34, the first aperture 62 of the mortise 40 and the bore 52 of the second tenon 36. The bolt 54 is then secured by the threaded nut 56. The first tenon 34 and the second tenon 36 are thereby rotatably connected to one another, thus allowing the gripping portion 12 to be pivotally positionable relative to the connecting portion 14, the connecting portion 14 being fixedly attached to the existing handle 16 of the wheelchair 18.

Figure 8:
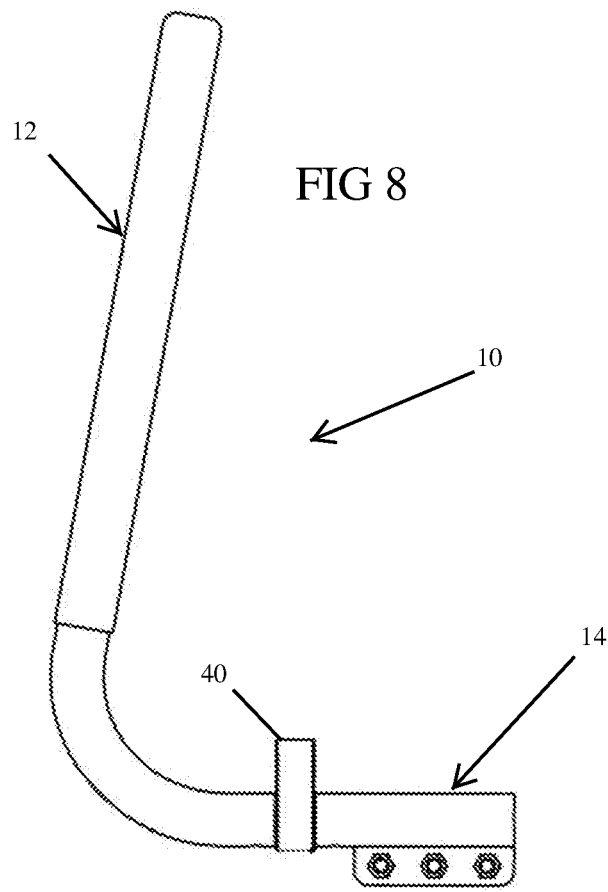
FIG. 8 is a side view of the wheelchair handle and lock of the present invention with the handle and the mortise in a raised position.
Figure 9:
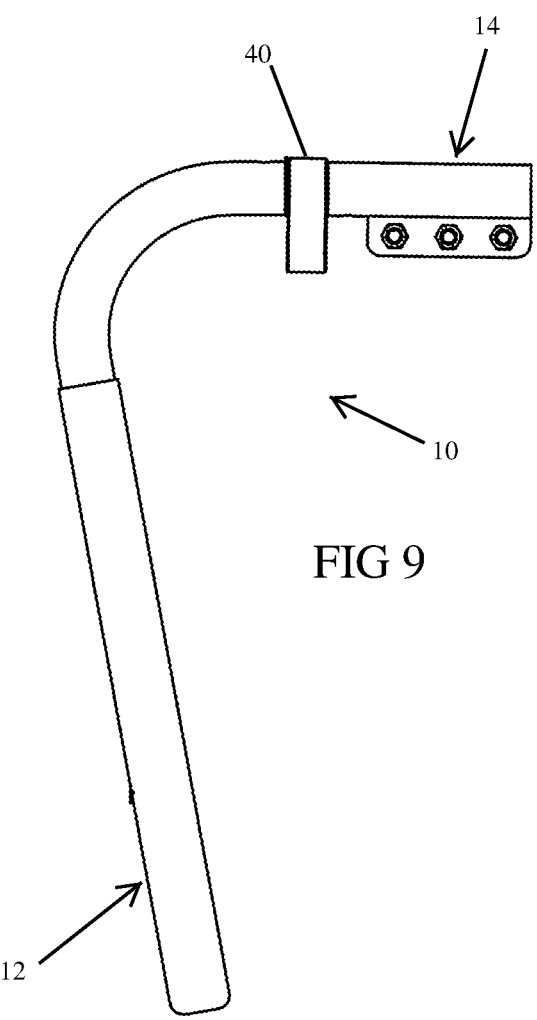
FIG. 9 is a side view of the wheelchair handle and lock of the present invention with the handle and mortise in a lowered position.

To lock the gripping portion 12 in either a first upward position or a second downward position, the mortise 40 is positionable between a lowered locked position, as illustrated in FIGS. 1 and 9, or a raised unlocked position, as illustrated in FIG. 8. While in the lowered locked position, which the mortise 40 naturally tends towards by its own weight, the first rectangular slot 62 engages the parallel walls 44, 46 of each tenon 34, 36, thereby preventing any pivotal or rotational movement of the first tenon 34 relative to the second tenon 36, and by extension, no pivotal movement of the gripping portion 12 relative to the connecting portion 14 can occur. As such, with the first tenon 34 being fixedly attached to the connecting portion 14, and the second tenon 36 being fixedly attached to the gripping portion 12, with the mortise 40 preventing pivotal or rotational movement of the second tenon 36 relative to the first tenon 34, the grasping portion 12, either while positioned in the first upward position (FIG. 1) or the second downward position (FIG. 9), is locked into place relative to the connection portion 14.

To change orientation of the grasping portion 12, for example from the upwardly extending position to the downwardly extending position, the mortise 40 is urged upward to the raised unlocked position, as illustrated in FIG. 8, wherein the parallel walls 44, 46 of the second tenon 36 are no longer engaged with the first rectangular slot 32, thereby allowing the grasping portion 12 to freely pivot or rotate. With the mortise 40 still in the upward unlocked position, the grasping portion 12 is permitted to pivot towards the second downwardly extending position, whereupon the user releasing the mortise 40, the mortise 40 is permitted by its own weight to once again travel to the downward locked position, with the first rectangular slot 62 again engaging the parallel walls 44, 46 of the second tenon 36, thus locking the grasping portion 12 in the second downwardly extending position. To position the grasping portion 12 towards the first upwardly extending position, the mortise 40 is again urged upwards, allowing the grasping portion 12 to freely pivot or rotate, whereupon the grasping portion 12 is pivoted toward the first upwardly extending position and, upon being released by the user, the mortise 40 is allowed to fall down back to the locked position, thus again locking the grasping portion 12.

Once the handle 10 of the present invention is attached to an existing wheelchair 18, as illustrated in FIG. 10, the user can grasp the grasping portion 12 of each handle 10 while in the first upwardly extending position without having to bend or hunch over. The user can then maneuver the wheelchair 18 while standing in a generally upright position, thereby decreasing or eliminating discomfort that may occur when maneuvering wheelchairs. When it comes time to stow the wheelchair 18, for example in a vehicle, the user lifts the mortise 40, thereby allowing the grasping portion 12 to be pivoted 180 degrees from the first upward extending position to the second downwardly extending position, and locked into place in the same manner as previously described. For purposes of illustration, FIG. 10 illustrates a wheelchair 18 with two handles 10 of the present invention attached to the existing wheelchair handles 16, with the grasping portion 12 of one handle 10*a* being in the first upwardly extending position, and the grasping portion 12 of the other handle 10*b* being in the second downwardly extending position.

It is recognized there are multiple variations beyond what are outlined in the detailed description to accomplish the objectives set forth by the current invention. Further alternative embodiments provide additional utility of the device for the convenience of the user. As such, although the present invention has been described with reference to preferred and alternative embodiments, workers skilled in the art will recognize that changes may be made in form and detail without departing from the spirit and scope of the invention.

The invention claimed is:

1. A two-position handle device for use with a wheelchair, the device comprising:
   a first member attachable to a handle of the wheelchair;
   a second member pivotally connected to the first member;
   a locking mechanism to lock the second member in either a first upwardly extending position or a second downwardly extending position, the locking mechanism comprising:
      a first tenon extending from the first member;
      a second tenon extending from the second member, the first tenon and the second tenon each having similar dimensions and pivotally connected to one another; and
      a mortise comprising:
         a first major surface and an opposing second major surface;
         a first aperture extending from the first major surface through to the second major surface, the first aperture for receiving the first tenon through the first surface and the second tenon through the second major surface, the first aperture having a width to accommodate the first tenon and the second tenon, the first aperture having a height at least double a height of the first and the second tenons; and
         a second aperture at least partially extending inward from a lower portion of the second major surface, the second aperture having a width and height to accommodate the height of the second tenon;
      wherein the mortise is positionable between a first lowered locked position and a second upward unlocked position, wherein the first aperture engages the first and the second tenons while the mortise is in the first lowered locked position thereby locking the first and second tenons in place, wherein the first aperture engages only the first tenon while the mortise is in the second upward unlocked position thereby permitting the second tenon to pivot relative to the first tenon.

2. The handle device of claim 1 wherein the first tenon and the second tenon are each configured to have semi-circular top and bottom ends with parallel sidewalls.

3. The handle device of claim 1 wherein the depth which the second aperture extends into the mortise from the second major surface is approximately a depth of the second tenon.

4. The handle device of claim 1 wherein the first aperture includes a rectangular configuration.

5. A two-position handle device for use with a wheelchair, the device comprising:
   a first member attachable to a handle of the wheelchair;
   a second member pivotally connected to the first member; and
   a locking mechanism to lock the second member in either a first upwardly extending position or a second downwardly extending position, the locking mechanism comprising:
      a first tenon extending from the first member;
      a second tenon extending from the second member, the first tenon and the second tenon each having similar dimensions and pivotally connected to one another; and
      a mortise comprising:
         a first major surface and an opposing second major surface;
         a first aperture extending from the first major surface through to the second major surface, the first aperture for receiving the first tenon from the first major surface and the second tenon from the second major surface, the first aperture having a width to accommodate the first tenon and the second tenon, the first aperture having a height at least double that of a height of the first and the second tenons; and
         a second aperture at least partially extending inward from a lower portion of the second major surface, the second aperture having a width and height to accommodate the height of the second tenon;
      wherein the mortise is positionable between a first lowered locked position and a second upward unlocked position, wherein the first aperture engages the first tenon and the second tenon while the mortise is in the first lowered locked position thereby locking the first tenon and the second tenon in place, wherein the first aperture engages only the first tenon while the mortise is in the second upward unlocked position thereby permitting the second tenon to pivot relative to the first tenon.

6. The handle device of claim 5 wherein the first tenon and the second tenon are each configured to have semi-circular top and bottom ends with parallel sidewalls.

7. The handle device of claim 5 wherein the depth which the second aperture extends into the mortise from the second major surface is approximately a depth of the second tenon.

8. The handle device of claim 5 wherein the first aperture includes a rectangular configuration.

9. A two-position handle device for use with a wheelchair, the device comprising:
   a connecting member attachable to a handle of the wheelchair;
   a grasping member pivotally connected to the connecting portion; and
   a locking mechanism to lock the grasping member in either a first upwardly extending position or a second downwardly extending position, the locking mechanism comprising:
      a first tenon extending from the connecting member;
      a second tenon extending from the grasping member, the first tenon and the second tenon each configured to have semi-circular top and bottom ends with parallel sidewalls and similar dimensions, the first tenon and the second tenon pivotally connected to one another; and
      a mortise comprising:
         a first major surface and an opposing second major surface;
         a first aperture of rectangular configuration extending from the first major surface through to the second major surface, the first aperture for receiving the first tenon from the first major surface and the second tenon from the second major surface, the first aperture having a width to accommodate the first tenon and the second tenon, the first aperture having a height at least double that of a height of the first and the second tenons; and a second aperture extending inward from a lower portion of the second major surface to a depth of approximately that of a depth of the second tenon, the second aperture having a width to accommodate the height of the second tenon;

wherein the mortise is positionable between a first lowered locked position and a second upward unlocked position, wherein the first aperture engages the first tenon and the second tenon while the mortise is in the first lowered locked position thereby locking the first and the second tenons in place, wherein the first aperture engages only the first tenon while the mortise is in the second upward unlocked position thereby permitting the second tenon to pivot relative to the first tenon.

\* \* \* \* \*